United States Patent
Bonica et al.

(10) Patent No.: US 9,960,994 B2
(45) Date of Patent: May 1, 2018

(54) METHOD, SYSTEM, AND APPARATUS FOR FORWARDING NETWORK TRAFFIC USING MINIMAL FORWARDING INFORMATION BASES

(71) Applicant: Juniper Networks, Inc., Sunnyvale, CA (US)

(72) Inventors: Ronald Bonica, Sterling, VA (US); Jonathan T. Looney, Syracuse, NY (US); Zhaohui Zhang, Westford, MA (US); Kireeti Kompella, Los Altos, CA (US)

(73) Assignee: Juniper Networks, Inc., Sunnyvale, CA (US)

( * ) Notice: Subject to any disclaimer, the term of this patent is extended or adjusted under 35 U.S.C. 154(b) by 111 days.

(21) Appl. No.: 15/078,111

(22) Filed: Mar. 23, 2016

(65) Prior Publication Data
US 2017/0279709 A1    Sep. 28, 2017

(51) Int. Cl.
*H04L 12/723* (2013.01)
*H04L 12/741* (2013.01)
(Continued)

(52) U.S. Cl.
CPC .............. *H04L 45/50* (2013.01); *H04L 43/16* (2013.01); *H04L 45/125* (2013.01); *H04L 45/54* (2013.01);
(Continued)

(58) Field of Classification Search
CPC ........................... H04L 12/5695; H04L 47/10
See application file for complete search history.

(56) References Cited

U.S. PATENT DOCUMENTS

2008/0080473 A1*  4/2008  Thubert .............. G06F 13/4045
                                                             370/348
2010/0246587 A1*  9/2010  Schutz .................... H04L 45/00
                                                             370/401
(Continued)

OTHER PUBLICATIONS

Gredler et al.; Egress Peer Engineering using BGP-LU; Oct. 26, 2014; https://tools.ietf.org/html/draft-gredler-idr-bgplu-epe-00.
(Continued)

*Primary Examiner* — Redentor Pasia
(74) *Attorney, Agent, or Firm* — FisherBroyles, LLP

(57) ABSTRACT

The disclosed computer-implemented method for forwarding network traffic using minimal Forwarding Information Bases (FIBS) may include (1) identifying a Routing Information Base (RIB) that includes a set of routes that define paths to destinations both inside and outside a network and then (2) creating a FIB that includes a subset of active routes whose size is below a size threshold by (A) importing, from the set of routes within the RIB, (I) internal routes that define paths to destinations inside the network, (II) high-traffic external routes that define paths to destinations outside the network, and (III) a default route that defines a path to a default node that facilitates resolution of traffic that does not match any of the internal or high-traffic external routes and (B) excluding, from the FIB, low-traffic external routes that define paths to destinations outside the network. Various other methods, systems, and apparatuses are also disclosed.

20 Claims, 6 Drawing Sheets

(51) Int. Cl.
    *H04L 12/26*     (2006.01)
    *H04L 12/729*    (2013.01)
    *H04L 12/743*    (2013.01)
    *H04L 12/755*    (2013.01)

(52) U.S. Cl.
    CPC ........ *H04L 45/7453* (2013.01); *H04L 45/021* (2013.01)

(56) References Cited

U.S. PATENT DOCUMENTS

| | | | | |
|---|---|---|---|---|
| 2010/0284403 | A1* | 11/2010 | Scudder | H04L 45/124 370/392 |
| 2012/0147888 | A1* | 6/2012 | Lu | H04L 45/54 370/392 |
| 2012/0213218 | A1* | 8/2012 | Yilmaz | H04L 45/02 370/351 |
| 2013/0107712 | A1* | 5/2013 | Allan | H04L 45/24 370/235 |
| 2014/0119374 | A1* | 5/2014 | Balasubramanian | H04L 67/28 370/392 |
| 2014/0119379 | A1* | 5/2014 | Liang | H04L 12/4625 370/401 |
| 2015/0110003 | A1* | 4/2015 | Wilkinson | H04L 45/54 370/329 |

OTHER PUBLICATIONS

Supported Features in EOS, https://www.arista.com/en/support/product-documentation/supported-features, as accessed Feb. 2, 2016, Arista Networks, Inc., (Apr. 22, 2015).

Subnetwork, https://en.wikipedia.org/wiki/Subnetwork, as accessed Feb. 2, 2016, Wikipedia, (Sep. 25, 2004).

Routing table, https://en.wikipedia.org/wiki/Routing_table, as accessed Feb. 2, 2016, Wikipedia, (Apr. 14, 2004).

Hop (networking), https://en.wikipedia.org/wiki/Hop_(networking), as accessed Feb. 2, 2016, Wikipedia, (Sep. 5, 2010).

Cisco Networking Academy's Introduction to Routing Dynamically, http://www.ciscopress.com/articles/article.asp?p=2180210&seqNum=12, as accessed Feb. 2, 2016, Cisco Networking Academy, (Mar. 24, 2014).

Sandesh Kumar Sodhi, et al; Method, System, and Apparatus for Classifying Uplink and Downlink Traffic in Networks; U.S. Appl. No. 15/053,203; filed Feb. 25, 2016.

P. Francis et al., FIB Suppression with Virtual Aggregation draft-ietf-grow-va-06.txt, https://tools.ietf.org/html/draft-ietf-grow-va-06, Network Working Group, (Dec. 30, 2011).

* cited by examiner

METHOD, SYSTEM, AND APPARATUS FOR FORWARDING NETWORK TRAFFIC USING MINIMAL FORWARDING INFORMATION BASES

BACKGROUND

Network traffic is often forwarded from one router to another. These routers may include a Routing Information Base (RIB) that stores a set of routes that facilitate network traffic to all of the Internet. For example, a router may include a RIB that stores approximately 575,000 Internet Protocol version 4 (IPv4) routes. In addition, this router may include a Forwarding Information Base (FIB) that imports copies of most of the approximately 575,000 IPv4 routes from the RIB. These copies stored in the FIB may represent and/or constitute the active routes used by the router to forward all Internet traffic.

In many cases, only a small fraction of these IPv4 routes may be needed to carry the vast majority of Internet traffic. For example, 90% of Internet traffic may traverse approximately 3,150 IPv4 routes, and 99% of Internet traffic may traverse approximately 25,900 IPv4 routes. Accordingly, the remaining approximately 549,100 IPv4 routes may be used to carry only 1% of Internet traffic. As a result, the FIB may be able to facilitate 90% of Internet traffic by importing only 0.5% of the IPv4 routes from the RIB or 99% of Internet traffic by importing only 4.5% of the IPv4 routes from the RIB.

In view of the above observation, the FIB may, in theory, be able to operate successfully using far less memory than the RIB. Moreover, because FIB memory is often much more expensive than RIB memory, routing equipment vendors may be able to significantly reduce manufacturing costs by decreasing the amount of FIB memory included in their routers and making efficient use of that decreased FIB memory. The instant disclosure, therefore, identifies and addresses a need for additional and improved methods, systems, and apparatuses for forwarding network traffic using minimal FIBS.

SUMMARY

As will be described in greater detail below, the instant disclosure generally relates to methods, systems, and apparatuses for forwarding network traffic using minimal FIBS. In one example, a method for accomplishing such a task may include (1) identifying a RIB that includes a set of routes that define paths to destinations both inside and outside a network and then (2) creating a FIB that includes a subset of active routes whose total size is below a size threshold by (A) importing, from the set of routes within the RIB into the FIB, (I) internal routes that define paths to destinations inside the network, (II) high-traffic external routes that define paths to destinations outside the network that are receiving amounts of traffic that exceed a traffic threshold, and (III) a default route that defines a path to a default node that facilitates resolution of traffic that does not match any of the internal or high-traffic external routes and (B) excluding, from the FIB, low-traffic external routes that define paths to destinations outside the network that do not receive amounts of traffic that exceed the traffic threshold.

Similarly, a system for implementing the above-described method may include (1) an identification module, stored in memory, that identifies a RIB that includes a set of routes that define paths to destinations both inside and outside a network and (2) a creation module, stored in memory, that creates a FIB that includes a subset of active routes whose total size is below a size threshold by (A) importing, from the set of routes within the RIB into the FIB, (I) internal routes that define paths to destinations inside the network, (II) high-traffic external routes that define paths to destinations outside the network that are receiving amounts of traffic that exceed a traffic threshold, and (III) a default route that defines a path to a default node that facilitates resolution of traffic that does not match any of the internal or high-traffic external routes and (B) excluding, from the FIB, low-traffic external routes that define paths to destinations outside the network that do not receive amounts of traffic that exceed the traffic threshold.

An apparatus for implementing the above-described method may include (1) a memory device that stores a RIB that includes a set of routes that define paths to destinations both inside and outside a network and (2) a processing unit communicatively coupled to the memory device, wherein the processing unit creates a FIB that includes a subset of active routes whose total size is below a size threshold by (A) importing, from the set of routes within the RIB into the FIB, (I) internal routes that define paths to destinations inside the network, (II) high-traffic external routes that define paths to destinations outside the network that are receiving amounts of traffic that exceed a traffic threshold, and (III) a default route that defines a path to a default node that facilitates resolution of traffic that does not match any of the internal or high-traffic external routes and (B) excluding, from the FIB, low-traffic external routes that define paths to destinations outside the network that do not receive amounts of traffic that exceed the traffic threshold.

Features from any of the above-mentioned embodiments may be used in combination with one another in accordance with the general principles described herein. These and other embodiments, features, and advantages will be more fully understood upon reading the following detailed description in conjunction with the accompanying drawings and claims.

BRIEF DESCRIPTION OF THE DRAWINGS

The accompanying drawings illustrate a number of exemplary embodiments and are a part of the specification. Together with the following description, these drawings demonstrate and explain various principles of the instant disclosure.

Figure 1:
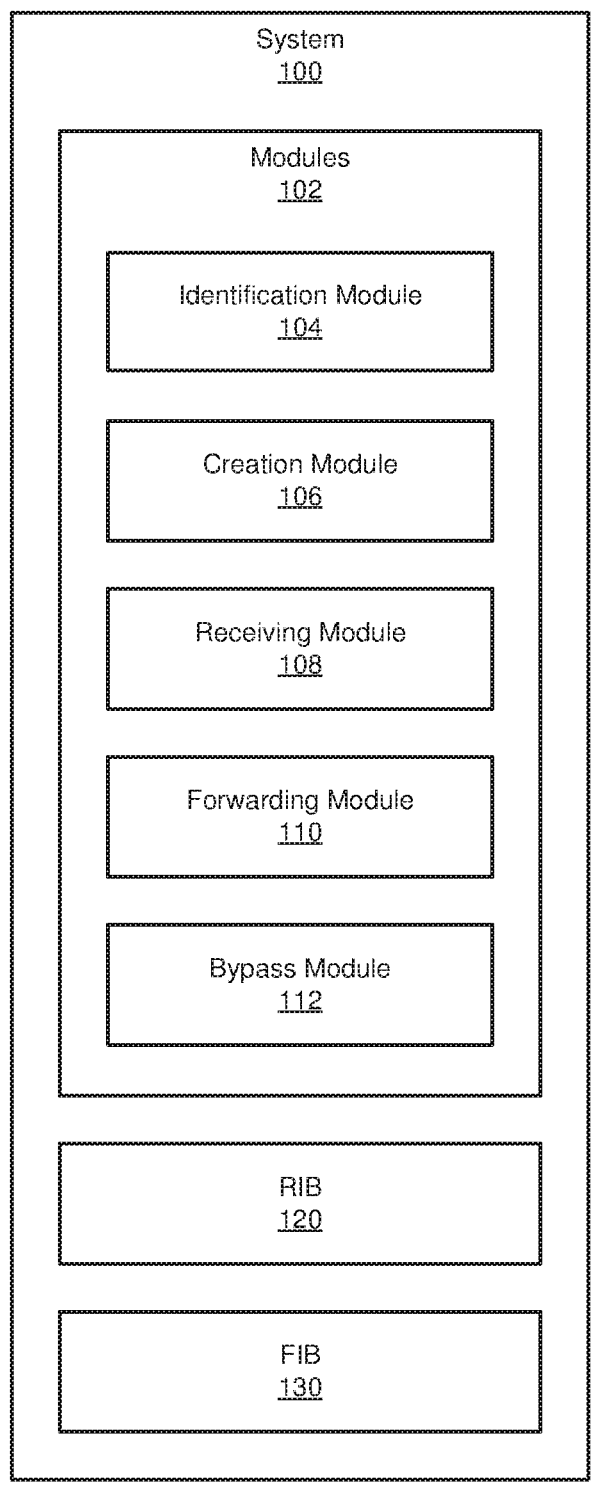
FIG. 1 is a block diagram of an exemplary system for forwarding network traffic using minimal FIBS.

Throughout the drawings, identical reference characters and descriptions indicate similar, but not necessarily identical, elements. While the exemplary embodiments described herein are susceptible to various modifications and alternative forms, specific embodiments have been shown by way of example in the drawings and will be described in detail herein. However, the exemplary embodiments described herein are not intended to be limited to the particular forms disclosed. Rather, the instant disclosure covers all modifications, equivalents, and alternatives falling within the scope of the appended claims.

DETAILED DESCRIPTION OF EXEMPLARY EMBODIMENTS

The present disclosure describes various methods, systems, and apparatuses for forwarding network traffic using minimal FIBS. As will be explained in greater detail below, embodiments of the instant disclosure may enable routers to operate successfully with much less FIB memory than traditional routers. As a result, embodiments of the instant disclosure may enable routing equipment vendors to significantly reduce costs in connection with the manufacture of routers. Additionally or alternatively, embodiments of the instant disclosure may enable routers to reduce the processing burden and/or resource consumption involved in building and/or maintaining FIBS, thereby freeing up some of the routers' processing power and/or resources for other routing and/or performance purposes or needs.

The following will provide, with reference to FIGS. 1, 2, 4, and 5, detailed descriptions of exemplary systems for forwarding network traffic using minimal FIBS. Detailed descriptions of corresponding computer-implemented methods will be provided in connection with FIG. 3. In addition, detailed descriptions of an exemplary computing system capable of implementing one or more of the embodiments described herein will be provided in connection with FIG. 6.

FIG. 1 is a block diagram of an exemplary system 100 for forwarding network traffic using minimal FIBS. As illustrated in this figure, exemplary system 100 may include one or more modules 102 for performing one or more tasks. For example, and as will be explained in greater detail below, exemplary system 100 may include an identification module 104 that identifies a RIB that includes a set of routes that define paths to destinations both inside and outside a network. Exemplary system 100 may also include a creation module 106 that creates a FIB that includes a subset of active routes whose total size is below a size threshold. Creation module 106 may create this FIB by (1) importing, from the set of routes within the RIB into the FIB, (A) internal routes, (B) high-traffic external routes, and (C) a default route and (2) excluding, from the FIB, low-traffic external routes.

In addition, and as will be described in greater detail below, exemplary system 100 may include a receiving module 108 that receives a packet to be forwarded to a destination based at least in part on the subset of active routes included in the FIB. Moreover, exemplary system 100 may include a forwarding module 110 that forwards the packet to the destination via the path defined by an active route that matches the destination of the packet. Exemplary system 100 may further include a bypass module 112 that bypasses the policy that defines which routes to import into the FIB by (1) setting a policy-bypass flag of at least one of the routes within the RIB and (2) installing the route into the FIB due at least in part to the policy-bypass flag being set. Although illustrated as separate elements, one or more of modules 102 in FIG. 1 may represent portions of a single module or application (such as a network operating system).

In certain embodiments, one or more of modules 102 in FIG. 1 may represent one or more software applications or programs that, when executed by a computing device, cause the computing device to perform one or more tasks. For example, and as will be described in greater detail below, one or more of modules 102 may represent software modules stored and configured to run on one or more computing devices, such as any of the devices illustrated in FIG. 2 (e.g., network devices 202, 204, 206, and/or 208), any of the devices illustrated in FIG. 4 (e.g., route-resolution proxy 406), any of the devices illustrated in FIG. 4 (e.g., route-resolution assistant 506), and/or computing system 600 in FIG. 6. One or more of modules 102 in FIG. 1 may also represent all or portions of one or more special-purpose computers configured to perform one or more tasks.

As illustrated in FIG. 1, system 100 may also include one or more RIBs, such as RIB 120. In one example, RIB 120 may include and/or store a set of routes that define paths to destinations both inside and outside a network. The term "path," as used herein, generally refers to any type or form of link and/or series of devices that facilitates communication and/or the flow of traffic between a source and a destination within a network and/or across networks. The term "route," as used herein, generally refers to any type or form of information, data, and/or representation that indicates and/or identifies a path within a network and/or across networks.

RIB 120 generally represents any type or form of database and/or table that includes, stores, and/or identifies one or more routes within a routing engine of a router. In one example, RIB 120 may include and/or represent a routing table that stores nearly all of the routes that constitute and/or form the Internet. The routes may be arranged and/or organized within the routing table in a variety of ways. Each route may indicate and/or identify various information and/or data representative of a path. Examples of such information and/or data include, without limitation, the Internet Protocol (IP) address of the destination device, the IP address of a gateway device, a routing prefix of the destination or gateway device, the IP address of the next hop, a network mask, combinations or variations of one or more of the same, and/or any other suitable information or data.

As illustrated in FIG. 1, system 100 may also include one or more FIBS, such as FIB 130. In one example, FIB 130 may include and/or store a subset of active routes that define paths to destinations both inside and outside a network. The term "active route," as used herein, generally refers to any type or form of route selected for forwarding network traffic to a particular destination. The term "subset," as used herein with reference to a set of routes, generally refers to a grouping and/or collection that includes less than all of the routes within the set.

FIB 130 generally represents any type or form of database and/or table that includes, stores, and/or identifies one or more active routes within a forwarding engine (sometimes also referred to as a packet forwarding engine) of a router. In one example, FIB 130 may include and/or represent a forwarding table that stores copies of only those routes selected from the RIB for forwarding network traffic to a particular destination. Accordingly, while RIB 120 may include several routes to the same destination, FIB 130 may include a single route to that destination.

In one example, FIB 130 may include and/or store (1) all internal routes that define paths to destinations inside a network, (2) select high-traffic external routes that define paths to destinations outside the network that are receiving amounts of traffic that exceed a traffic threshold, and (3) a default route that defines a path to a default node that facilitates resolution of traffic that does not match any of the internal or high-traffic external routes. In this example, FIB 130 may exclude various low-traffic external routes that define paths to destinations outside the network that do not receive amounts of network traffic that exceed the traffic threshold. Accordingly, FIB 130 may be substantially smaller than RIB 120.

As a specific example, RIB 120 may include and/or store 575,000 IPv4 route entries. In this example, 90% of all network traffic may traverse 3,150 of those IPv4 routes, and 99% of all network traffic may traverse 25,900 of those IPv4 routes. Accordingly, the remaining approximately 549,100 IPv4 routes may be used to carry only 1% of all network traffic. In view of this observation, FIB 130 may be programmed, configured, and/or set to include and/or store copies of only those 25,900 IPv4 routes that collectively facilitate 99% of all network traffic. As a result, since FIB 130 includes a default route used to forward the remaining 1% of network traffic, FIB 130 may be able to operate successfully using far less memory than RIB 120 and/or a traditional FIB.

Figure 2:
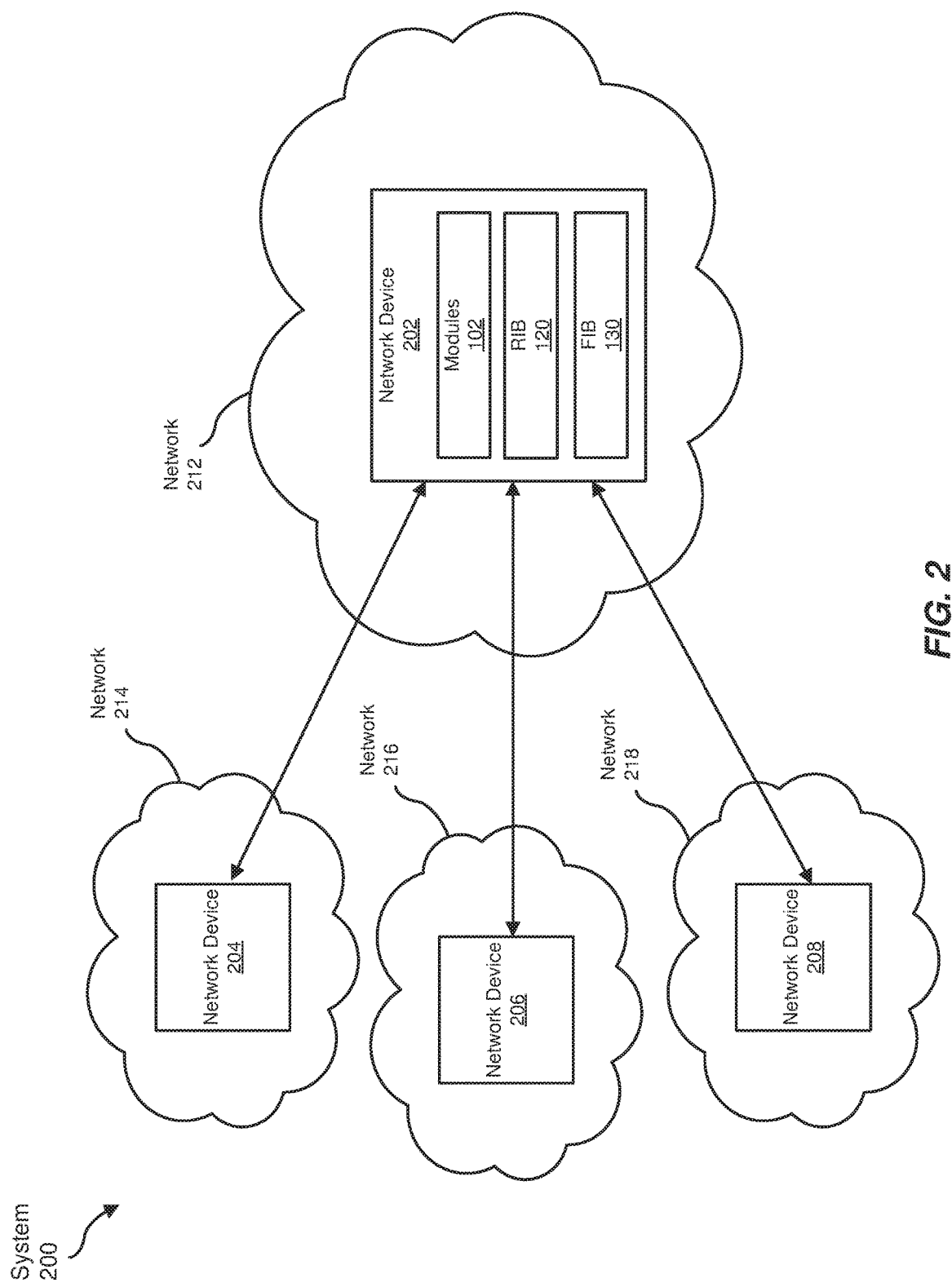
FIG. 2 is a block diagram of an exemplary system for forwarding network traffic using minimal FIBS.

Exemplary system 100 in FIG. 1 may be implemented in a variety of ways. For example, all or a portion of exemplary system 100 may represent portions of exemplary system 200 in FIG. 2. As shown in FIG. 2, system 200 may include a network 212 that includes a network device 202, a network 214 that includes a network device 204, a network 216 that includes a network device 206, and a network 218 that includes a network device 208. Each of networks 212, 214, 216, and 218 may support and/or facilitate communication and/or data transfer among network devices 202, 204, 206, and 208 and/or various client devices (not illustrated in FIG. 2). Although FIG. 2 illustrates only network devices 202, 204, 206, and 208 within networks 212, 214, 216, and 218, respectively, various other network devices and/or computing devices may represent part of networks 212, 214, 216, and 218 and/or be included in networks 212, 214, 216, and 218.

In one example, network device 206 may be programmed with one or more of modules 102. In this example, network device 206 may include, store, and/or maintain RIB 120. Although not necessarily illustrated in this way in FIG. 2, network devices 202, 204, 206, and 208 may also be programmed with one or more of modules 102. Similarly, although not necessarily illustrated in this way in FIG. 2, network devices 202, 204, 206, and 208 may also include, store, and/or maintain a RIB and/or a FIB.

In one example, one or more of modules 102 from FIG. 1 may, when executed by at least one processor of network device 202 in FIG. 2, enable network device 202 to forward network traffic using a minimal FIB. For example, and as will be described in greater detail below, one or more of modules 102 may cause network device 202 to (1) identify a RIB that includes a set of routes that define paths to destinations both inside and outside a network and then (2) create a FIB that includes a subset of active routes whose total size is below a size threshold by (A) importing, from the set of routes within the RIB into the FIB, (I) internal routes that define paths to destinations inside the network, (II) high-traffic external routes that define paths to destinations outside the network that are receiving amounts of traffic that exceed a traffic threshold, and (III) a default route that defines a path to a default node that facilitates resolution of traffic that does not match any of the internal or high-traffic external routes and (B) excluding, from the FIB, low-traffic external routes that define paths to destinations outside the network that do not receive amounts of traffic that exceed the traffic threshold.

Network devices 202, 204, 206, and/or 208 each generally represent any type or form of device, system, and/or mechanism that facilitates communication and/or network traffic among computing devices and/or within a network or across networks. In one example, network devices 202, 204, 206, and/or 208 may each represent a router. Additionally or alternatively, network devices 202, 204, 206, and/or 208 may each include and/or represent a gateway to a network. Examples of network devices 202, 204, 206, and/or 208 include, without limitation, routers (such as provider edge routers, hub routers, spoke routers, autonomous system boundary routers, and/or area border routers), switches, hubs, modems, bridges, repeaters, gateways, multiplexers, network adapters, network interfaces, network racks, chasses, servers, computing devices, virtual machines running on one or more of the same, portions of one or more of the same, combinations or variations of one or more of the same, and/or any other suitable network device.

Networks 212, 214, 216, and/or 218 each generally represent to any type or form of medium and/or architecture that facilitates communication or data transfer. In one example, one or more of networks 212, 214, 216, and/or 218 may represent a network that facilitates traffic for subscribers of a service provider (such as AT&T, VERIZON WIRELESS, SPRINT, T-MOBILE, FACEBOOK, GOOGLE, INSTAGRAM, NETFLIX, AMAZON, YOUTUBE, CENTURY LINK, COMCAST, DIRECTV, and/or APPLE). Examples of networks 212, 214, 216, and/or 218 include, without limitation, an MPLS network, an intranet, a Wide Area Network (WAN), a Local Area Network (LAN), a Personal Area Network (PAN), the Internet, Power Line Communications (PLC), a cellular network (e.g., a Global System for Mobile Communications (GSM) network), a peer network, portions of one or more of the same, combinations or variations of one or more of the same, and/or any other suitable networks. Networks 212, 214, 216, and/or 218 may facilitate communication or data transfer using wireless and/or wired connections. Although FIG. 2 illustrates networks 212, 214, 216, and/or 218 as each including only a single device, these networks may each include various other network devices and/or computing devices.

Figure 3:
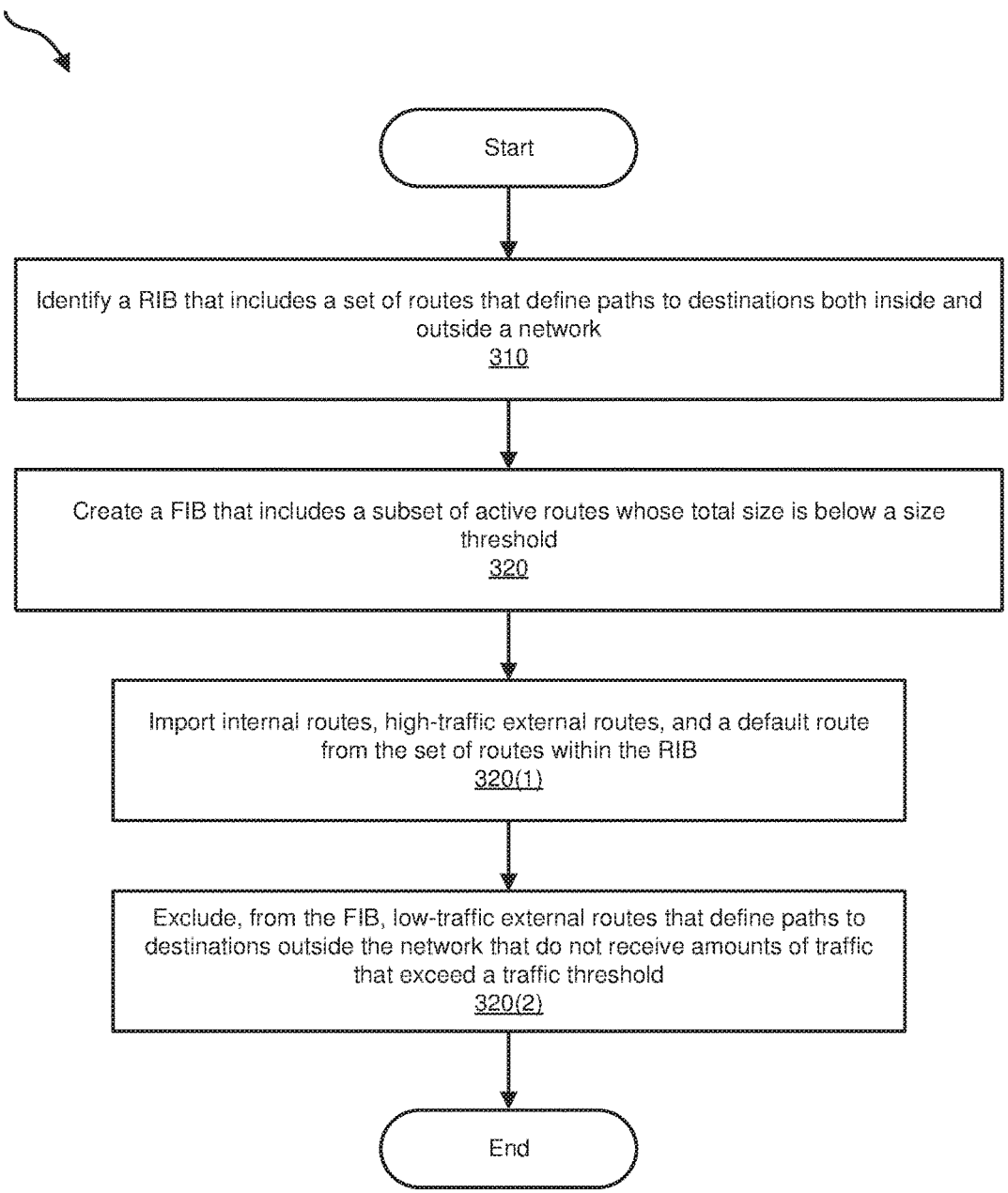
FIG. 3 is a flow diagram of an exemplary method for forwarding network traffic using minimal FIBS.

FIG. 3 is a flow diagram of an exemplary computer-implemented method 300 for forwarding network traffic using minimal FIBS. The steps shown in FIG. 3 may be performed by any suitable computer-executable code and/or computing system. In some embodiments, the steps shown in FIG. 3 may be performed by one or more of the components of system 100 in FIG. 1, system 200 in FIG. 2, system 400 in FIG. 4, and/or computing system 600 in FIG. 6.

As illustrated in FIG. 3, at step 310 one or more of the systems described herein may identify a RIB that includes a set of routes that define paths to destinations both inside and outside a network. For example, identification module 104 may, as part of network device 202 in FIG. 2, identify RIB 120 that includes a set of routes that define paths to destinations both inside and outside network 212. In this example, RIB 120 may include and/or store routes of various protocols (such as IPv4, Internet Protocol version 6 (IPv6), Border Gateway Protocol (BGP), and/or Interior Gateway Protocol (IGP)). Additionally or alternatively, RIB 120 may include and/or store dynamic routes, static routes, direct routes, indirect routes, and/or a default route.

The systems described herein may perform step 310 in a variety of ways and/or contexts. In one example, identification module 104 may identify RIB 120 based at least in part on a request to create and/or modify FIB 130. For example, identification module 104 may detect a request to create and/or modify FIB 130 in order to facilitate communication with the Internet. In response to detecting this request, identification module 104 may identify RIB 120 to initiate importing routes from FIB 130.

In another example, identification module 104 may identify RIB 120 based at least in part on route advertisements received by network device 202. For example, identification module 104 may detect one or more route advertisements circulated across network 212. In this example, network device 202 may add the advertised routes to RIB 120. Identification module 104 may then identify RIB 120 as the routes are added in connection with the advertisements.

Returning to FIG. 3, at step 320 one or more of the systems described herein may create a FIB that includes a subset of active routes whose total size is below a size threshold. For example, creation module 106 may, as part of network device 202 in FIG. 2, create FIB 130 that includes a subset of active routes whose total size is below a size threshold. This size threshold may include and/or represent a certain number of routes (e.g., 30,000 routes) and/or a certain amount of memory consumed by such routes. As a specific example, the size threshold may include and/or represent the total amount of memory allocated to FIB 130. Accordingly, creation module 106 may create FIB 130 by populating the subset of active routes with the highest number of routes capable of fitting in the amount of memory allocated and/or available to FIB 130.

As illustrated in FIG. 3, the FIB-creation process may include certain sub-steps. For example, at sub-step 320(1) in FIG. 3, creation module 106 may, as part of network device 202 in FIG. 2, import various routes from the set of routes within RIB 120 into FIB 130. These imported routes may include and/or represent (1) internal routes that define paths to destinations inside network 212, (2) high-traffic external routes that define paths to destinations outside network 212 that are receiving amounts of traffic that exceed a traffic threshold, and (3) a default route that defines a path to a default node (such as another network device) that facilitates resolution of traffic that does not match any of the internal or high-traffic external routes within FIB 130.

Continuing with this example, at sub-step 320(2) in FIG. 3, creation module 106 may, as part of network device 202 in FIG. 2, exclude low-traffic external routes that define paths to destinations outside the network that do not receive amounts of traffic that exceed the traffic threshold. In other words, creation module 106 may ensure that all such low-traffic external routes are excluded from FIB 130. This traffic threshold may include and/or represent a certain number of packets transferred by way of a particular destination. Additionally or alternatively, this traffic threshold may include and/or represent a certain frequency that a particular destination receives traffic. Further, this traffic threshold may include and/or represent a marker that distinguishes the top external destinations (e.g., the top 100, 500, or 1000 websites visited by client devices whose traffic is routed by network device 202) from all other external destinations with respect to the amount of traffic received.

The systems described herein may perform step 320 and sub-steps 320(1) and 320(2) in a variety of ways. In some examples, creation module 106 may create FIB 130 based at least in part on a policy that defines which routes within RIB 120 to import into FIB 130. For example, identification module 104 may identify a RIB-to-FIB export policy. In this example, the RIB-to-FIB export policy may indicate which routes FIB 130 is to accept from RIB 120 and which routes FIB 130 is to reject from RIB 120.

As a specific example, the RIB-to-FIB export policy may indicate that FIB 130 is to include all internal routes learned from Internal BGP (IBGP) neighbors. Alternatively, the RIB-to-FIB export policy may indicate that FIB 130 is to include all internal routes learned from non-External BGP (non-EBGP) neighbors. In other words, the RIB-to-FIB export policy may indicate that FIB 130 is to include all routes internal to network 212.

In addition, the RIB-to-FIB export policy may indicate that FIB 130 is to include all important routes that are external to network 212. Important external routes may include and/or represent consistently important external routes and occasionally important external routes. Examples of consistently important external routes include, without limitation, emergency-related external routes (such as routes related to public safety, medical emergencies, police emergencies, and/or "911" emergencies), generally high-traffic routes (such as routes to the ALEXA top 100 websites and/or generally popular routes), combinations or variations of one or more of the same, and/or any other suitable consistently important external routes. In one example, these consistently important external routes may be statically programmed, configured, and/or set in the RIB-to-FIB export policy. Accordingly, creation module 106 may ensure that these consistently important external routes are installed into FIB 130 whenever they are present within RIB 120.

Occasionally important external routes may include and/or represent those routes that define paths to destinations that have recently received a high level of traffic. In one example, network device 202 may learn these routes dynamically by monitoring outbound traffic. In this example, creation module 106 may install these occasionally important external routes into FIB 130 whenever their corresponding destinations are receiving a level of traffic that exceeds the traffic threshold. In other words, creation module 106 may install any high-traffic external routes that define paths to destinations whose popularity relative to network device 202 currently ranks above a certain popularity threshold (e.g., the popularity of those destinations relative to the popularity of all external destinations). Conversely, creation module 106 may remove these occasionally important external routes from FIB 130 whenever their corresponding destinations are no longer receiving a level of traffic that exceeds the traffic threshold and/or whose popularity no longer rank above the popularity threshold.

In some examples, creation module 106 may import and/or install select routes into FIB 130 by copying those routes from RIB 120 to FIB 130. For example, identification module 104 may identify a destination that is currently receiving an amount of traffic that exceeds the traffic threshold. Identification module 104 may then identify the route that defines the best path to that destination within RIB 120. Once the route that defines the best path has been identified, creation module 106 may install a copy of that route into FIB 130.

Additionally or alternatively, creation module 106 may remove any less important routes from FIB 130. For example, identification module 104 may determine that a destination to which a formerly high-traffic external route corresponds is no longer receiving an amount of traffic that exceeds the traffic threshold. In response to this determination, creation module 106 may remove that route by deleting the copy of that route from FIB 130. This removal and/or deletion may create and/or free up available space in FIB 130 to import additional routes (e.g., newly high-traffic routes) from RIB 120.

In some examples, network device 202 may modify and/or update the RIB-to-FIB export policy. These modifications and/or updates to the RIB-to-FIB export policy may place a high processing and/or resource burden on network device 202. As a result, network device 202 may modify and/or update the RIB-to-FIB export policy on a fairly infrequent basis to avoid unnecessarily burdening network device 202 and/or hampering its performance.

In view of this observation, creation module 106 may modify and/or update FIB 130 to include currently high-traffic external routes by bypassing the RIB-to-FIB policy. For example, identification module 104 may determine that a destination is currently receiving an amount of traffic that exceeds the traffic threshold. In this example, bypass module 112 may, as part of network device 202 in FIG. 2, bypass the RIB-to-FIB policy by setting a policy-bypass flag of at least one of the routes within RIB 120. This route may define a path to the destination that is currently receiving an amount of traffic that exceeds the traffic threshold.

The term "policy-bypass flag," as used herein, generally refers to any type or form of indicator, mark, and/or identifier that indicates whether to bypass a policy. This policy-bypass flag may include and/or represent a binary and/or Boolean representation, bit, or integer. In one example, each route entry within RIB 120 may include a policy-bypass flag. In this example, the policy-bypass flag may convey and/or indicate whether creation module 106 is to bypass the RIB-to-FIB policy with respect to the corresponding route entry. Accordingly, in the event that the policy-bypass flag of a particular route is set within RIB 120, creation module 106 may import and/or install that route into FIB 130 even though the RIB-to-FIB policy does not call for that route to be imported and/or installed into FIB 130. In other words, creation module 106 may import and/or install any route whose policy-bypass flag is set into FIB 130 regardless of the directives, instructions, and/or rules of the RIB-to-FIB policy.

Conversely, in the event that the policy-bypass flag of a particular route is cleared within RIB 120, the RIB-to-FIB policy may again control whether that route stays in FIB 130 or is removed from FIB 130. In other words, once the policy-bypass flag of a particular route is cleared, creation module 106 may remove that route from FIB 130 provided that the RIB-to-FIB policy does not call for that route to be installed into FIB 130.

To ensure that the total size of the subset of active routes within FIB 130 stays below the size threshold, creation module 106 may exclude various routes included in RIB 120 from FIB 130. For example, creation module 106 may determine that the RIB-to-FIB policy does not call for a particular route to be installed into FIB 130 and the policy-bypass flag of a particular route within RIB 120 is cleared or not set. In response to these determinations, creation module 106 may intentionally exclude that route from FIB 130 by refusing to import and/or install that route from RIB 120 into FIB 130. By doing so, creation module 106 may maintain the size of the subset of active routes within FIB 130 at a certain level.

As described above, the various systems and methods described herein may be able to forward network traffic using minimal FIBS. While, in some examples, the internal and important external routes in FIB 130 may be able to facilitate the handling of the vast majority (e.g., 90-99%) of network traffic, the remaining network traffic may fail to match any of the internal or important external routes in FIB 130. As a result, such network traffic may be forwarded to the destination whose path is defined by the default route.

The term "default route," as used herein, generally refers to any type or form of route that defines a path to a node that facilitates resolution of traffic that does not match any of the internal or important external routes in a FIB. For example, receiving module 108 may, as part of network device 202 in FIG. 2, receive a packet to be forwarded to a destination based at least in part on the active routes included in FIB 130. In response to the receipt of this packet, identification module 104 may identify the destination of the packet and then search FIB 130 for an active route that defines a path to that same destination. In the event that identification module 104 is able to find such a route, forwarding module 108 may, as part of network device 202 in FIG. 2, forward the packet to that destination via the path defined by the route.

However, in the event that identification module 104 is unable to find such a route, forwarding module 108 may forward the packet to a default node via a path defined by the default route in FIB 130. In this example, the default node may resolve the remainder of the path to the packet's destination by way of the default node's FIB. Accordingly, the default node may facilitate the resolution of traffic that does not match any of the internal or important external routes within FIB 130.

The term "default node," as used herein, generally refers to any type or form of network device that receives traffic by way of the default route of a FIB. Examples of such a default node include, without limitation, routers (such as provider edge routers, hub routers, spoke routers, autonomous system boundary routers, and/or area border routers), switches, hubs, modems, bridges, repeaters, gateways, multiplexers, network adapters, network interfaces, network racks, chassis, servers, computing devices, virtual machines running on one or more of the same, portions of one or more of the same, combinations or variations of one or more of the same, and/or any other suitable device.

As a specific example in connection with FIG. 2, system 200 may include and/or represent a network configuration in which networks 212, 214, 216, and 218 in FIG. 2 are peered with one another. In this example, network device 204 in FIG. 2 may send a flow of packets to network device 202 in FIG. 2. As this traffic reaches network device 202 in FIG. 2, identification module 104 may identify the destination of the flow of packets. In the event that no matching route is found in FIB 130 in FIG. 2, identification module 104 may determine that this flow of packets should be forwarded by way of the default route. In this example, the default route may identify the default node as network device 208 in FIG. 2. Accordingly, forwarding module 108 may forward this flow of packets to network device 208 in FIG. 2. Upon receiving this flow of packets, network device 208 in FIG. 2 may resolve the remainder of the path to the packet's destination even though network device 202 in FIG. 2 was unable to do so.

The network configuration of system 200 in FIG. 2 may represent a good option when a personal network or intranet is peering with a transit provider (such as AT&T, VERIZON WIRELESS, SPRINT, T-MOBILE). However, this network configuration may be less preferable when two transit providers are peering with one another. To avoid routing loops, network devices operating in this network configuration may need to ensure that they do not apply default routes to each other.

Figure 4:
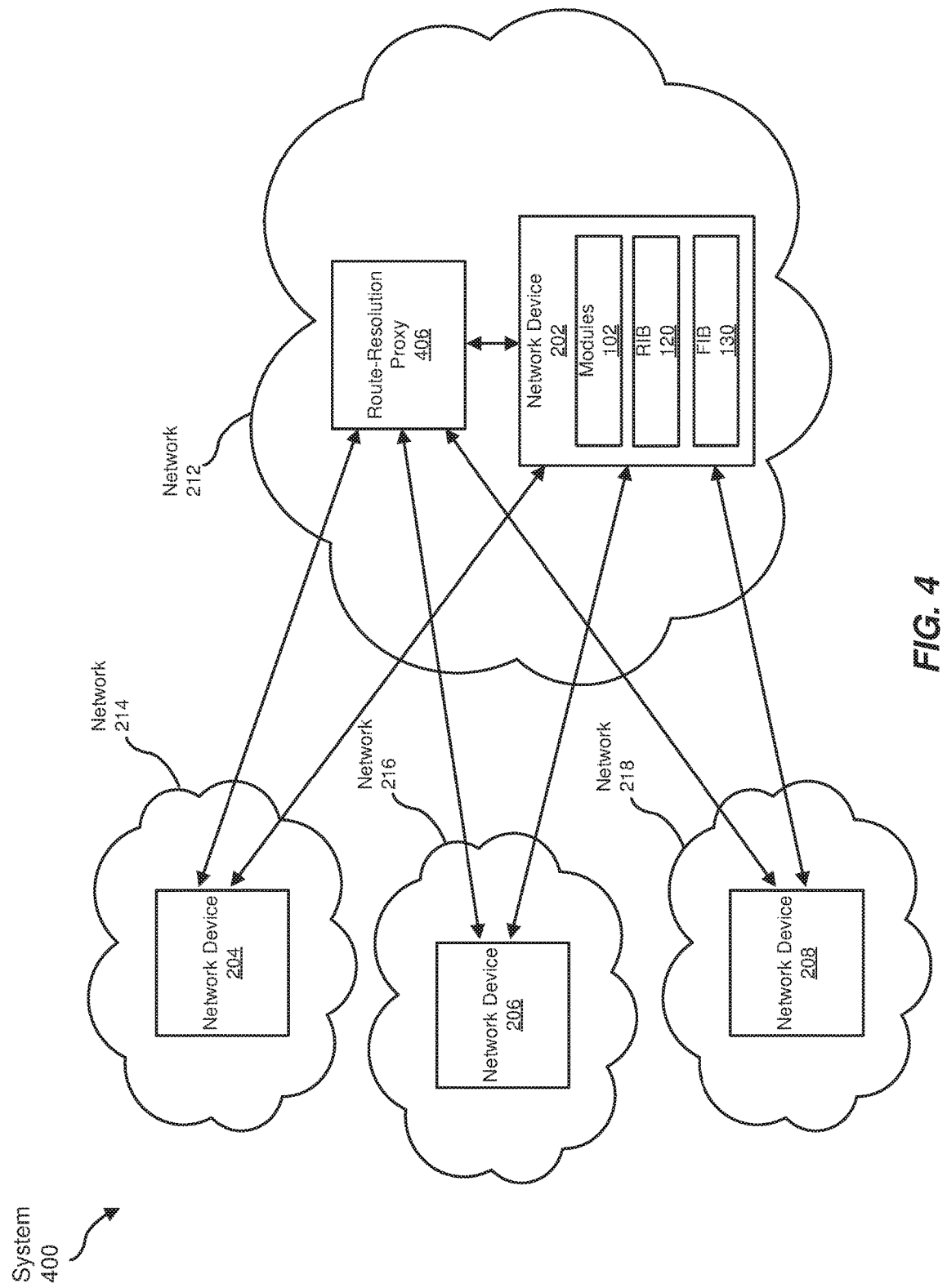
FIG. 4 is a block diagram of an exemplary system for forwarding network traffic using minimal FIBS.

As another example in connection with FIG. 4, system 400 may include and/or represent a network configuration in which networks 212, 214, 216, and 218 in FIG. 4 are peered with one another. In this example, network device 204 in FIG. 4 may send a flow of packets to network device 202 in FIG. 4. As this traffic reaches network device 202 in FIG. 4, identification module 104 may identify the destination of the flow of packets. In the event that no matching route is found in FIB 130 in FIG. 4, identification module 104 may determine that this flow of packets should be forwarded by way of the default route. In this example, the default route may identify the default node as a route-resolution proxy 406 in FIG. 4, which includes a copy of the set of routes within RIB 120 and interfaces with networks 214, 216, and 218 by way of peering. Accordingly, forwarding module 108 may forward this flow of packets to route-resolution proxy 406 in FIG. 4.

Upon receiving this flow of packets, route-resolution proxy 406 may resolve the remainder of the path to the packet's destination even though network device 202 was unable to do so. For example, route-resolution proxy 406 may identify one of peer networks 214, 216, and 218 and/or network devices 204, 206, and 208 as a next hop of this flow of packets. Route-resolution proxy 406 may then forward the flow of packets to this next hop.

Figure 5:
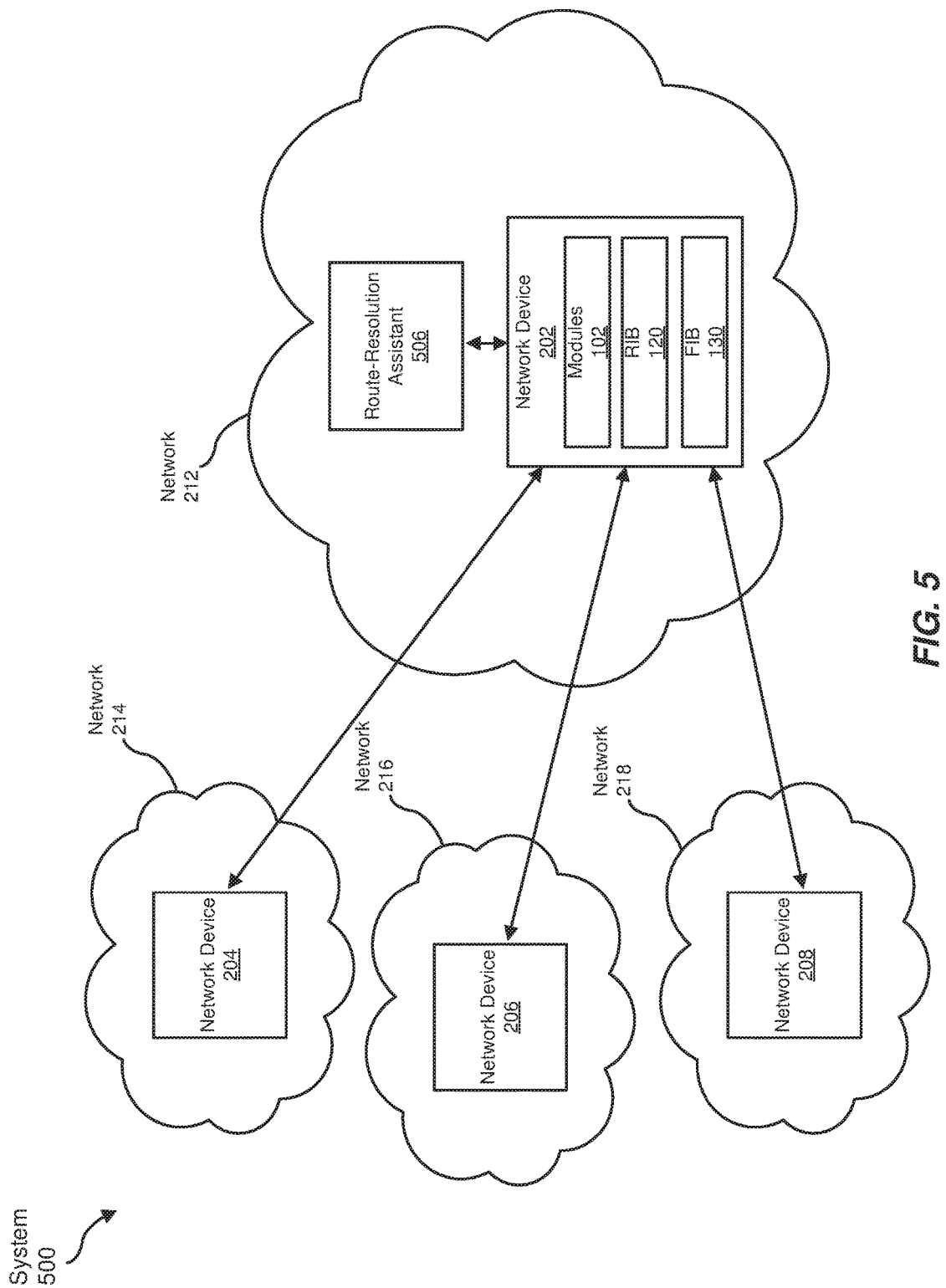
FIG. 5 is a block diagram of an exemplary system for forwarding network traffic using minimal FIBS.

As a further example in connection with FIG. 5, system 500 may include and/or represent a network configuration in which networks 212, 214, 216, and 218 in FIG. 5 are peered with one another. In this example, network device 204 in FIG. 5 may send a flow of packets to network device 202 in FIG. 5. As this traffic reaches network device 202 in FIG. 5, identification module 104 may identify the destination of the flow of packets. In the event that no matching route is found in FIB 130 in FIG. 5, identification module 104 may determine that this flow of packets should be forwarded by way of the default route. In this example, the default route may identify the default node as a route-resolution assistant 506 in FIG. 5. Accordingly, forwarding module 108 may forward this flow of packets to route-resolution assistant 506 in FIG. 5.

Upon receiving this flow of packets from network device 202, route-resolution assistant 506 may determine a route that defines a path to a next hop of the flow of packets. Route-resolution assistant 506 may then apply an MPLS label to the flow of packets. In this example, the MPLS label may identify the next hop of the flow of packets. Route-resolution assistant 506 may then return the flow of packets with the MPLS label to network device 202.

As the flow of packets with the MPLS label reaches network device 202, receiving module 108 may receive the flow of packets. Identification module 104 may determine the next hop of the flow of packets based at least in part on the MPLS label. Upon determining the next hop, forwarding module 110 may remove the MPLS label from the flow of packets and then forward the flow of packets to the next hop to facilitate delivery to the final destination.

Additionally or alternatively, route-resolution assistant 506 may forward the flow of packets with the MPLS label to another network device (not illustrated in FIG. 5) within network 212. Like network device 202, this other network device may rely on route-resolution assistant 506 for route resolution. For example, the default route of this other network device may identify the default node as a route-resolution assistant 506 in FIG. Accordingly, this other network device may forward packets to route-resolution assistant 506 in the event that no matching route is found the device's FIB, and route-resolution assistant 506 may serve multiple network devices simultaneously.

The network configuration of system 500 in FIG. 5 may represent a good option when two transit providers are peering with one another. However, this network configuration may be less preferable when a personal network or intranet is peering with a transit provider.

In some examples, FIB 130 may include multiple default routes. For example, FIB 130 may include default routes that collectively define paths to peer networks 214, 216, and 218. In this example, peer networks 214, 216, and 218 may facilitate resolution of traffic that does not match any of the internal or high-traffic external routes in FIB 130.

In one example, identification module 104 may identify header information in connection with a packet received at network device 202. Creation module 106 may then generate a hash from the header information identified in connection with the packet. The resulting hash may correspond to one of peer networks 214, 216, and 218. Upon generation of the hash, forwarding module 110 may select the corresponding peer network as the intermediate destination of the packet based at least in part on the hash. Forwarding module 110 may then forward the packet to the selected peer network to enable that peer network to determine a route that defines a path to the next hop and/or final destination of the packet.

As explained above in connection with FIGS. 1-5, routers may operate successfully with much less FIB memory than RIB memory by making efficient use of that FIB memory. By decreasing the amount of FIB memory in routers, routing equipment vendors may be able to significantly reduce manufacturing costs. Moreover, such routers may reduce the processing burden and/or resource consumption involved in building and/or maintaining FIBS, thereby freeing up processing power and/or resources for other routing and/or performance purposes or needs.

Figure 6:
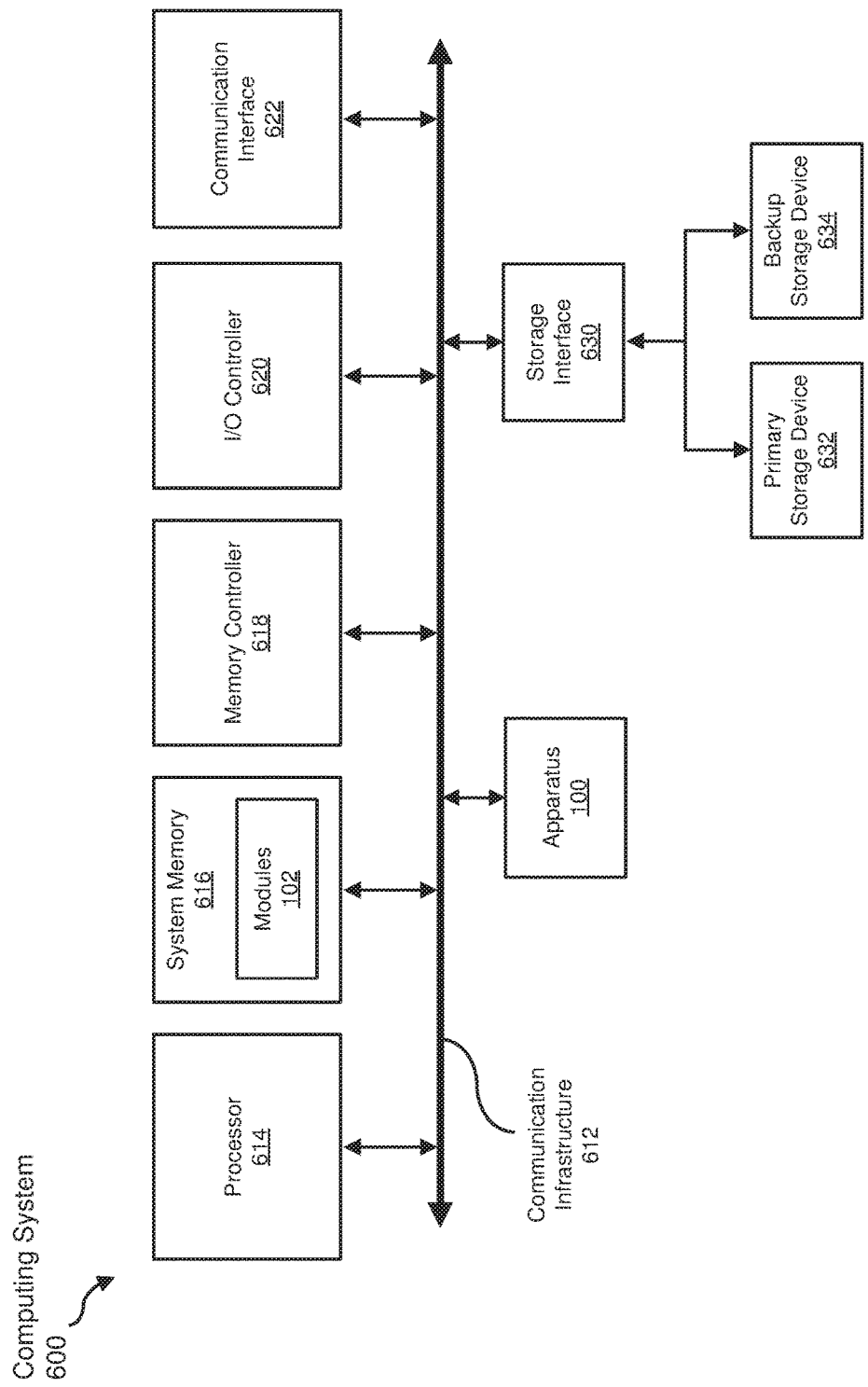
FIG. 6 is a block diagram of an exemplary computing system capable of implementing and/or being used in connection with one or more of the embodiments described and/or illustrated herein.

FIG. 6 is a block diagram of an exemplary computing system 600 capable of implementing and/or being used in connection with one or more of the embodiments described and/or illustrated herein. In some embodiments, all or a portion of computing system 600 may perform and/or be a means for performing, either alone or in combination with other elements, one or more of the steps described in connection with FIG. 3. All or a portion of computing system 600 may also perform and/or be a means for performing and/or implementing any other steps, methods, or processes described and/or illustrated herein. In one example, computing system 600 may include an apparatus that performs and/or constitutes a means for performing and/or implementing any other steps, methods, or processes described and/or illustrated herein.

Computing system 600 broadly represents any type or form of electrical load, including a single or multi-processor computing device or system capable of executing computer-readable instructions. Examples of computing system 600 include, without limitation, workstations, laptops, client-side terminals, servers, distributed computing systems, mobile devices, network switches, network routers (e.g., backbone routers, edge routers, core routers, mobile service routers, broadband routers, etc.), network appliances (e.g., network security appliances, network control appliances, network timing appliances, SSL VPN (Secure Sockets Layer Virtual Private Network) appliances, etc.), network controllers, gateways (e.g., service gateways, mobile packet gateways, multi-access gateways, security gateways, etc.), and/or any other type or form of computing system or device.

Computing system 600 may be programmed, configured, and/or otherwise designed to comply with one or more networking protocols. According to certain embodiments, computing system 600 may be designed to work with protocols of one or more layers of the Open Systems Interconnection (OSI) reference model, such as a physical layer protocol, a link layer protocol, a network layer protocol, a transport layer protocol, a session layer protocol, a presentation layer protocol, and/or an application layer protocol. For example, computing system 600 may include a network device configured according to a Universal Serial Bus (USB) protocol, an Institute of Electrical and Electronics Engineers (IEEE) 1394 protocol, an Ethernet protocol, a T1 protocol, a Synchronous Optical Networking (SONET) protocol, a Synchronous Digital Hierarchy (SDH) protocol, an Integrated Services Digital Network (ISDN) protocol, an Asynchronous Transfer Mode (ATM) protocol, a Point-to-Point Protocol (PPP), a Point-to-Point Protocol over Ethernet (PPPoE), a Point-to-Point Protocol over ATM (PPPoA), a Bluetooth protocol, an IEEE 802.XX protocol, a frame relay protocol, a token ring protocol, a spanning tree protocol, and/or any other suitable protocol.

Computing system 600 may include various network and/or computing components. For example, computing system 600 may include at least one processor 614 and a system memory 616. Processor 614 generally represents any type or form of processing unit capable of processing data or interpreting and executing instructions. For example, processor 614 may represent an application-specific integrated circuit (ASIC), a system on a chip (e.g., a network processor), a hardware accelerator, a general purpose processor, and/or any other suitable processing element.

Processor 614 may process data according to one or more of the networking protocols discussed above. For example, processor 614 may execute or implement a portion of a protocol stack, may process packets, may perform memory operations (e.g., queuing packets for later processing), may execute end-user applications, and/or may perform any other processing tasks.

System memory 616 generally represents any type or form of volatile or non-volatile storage device or medium capable of storing data and/or other computer-readable instructions. Examples of system memory 616 include, without limitation, Random Access Memory (RAM), Read Only Memory (ROM), flash memory, or any other suitable memory device. Although not required, in certain embodiments computing system 600 may include both a volatile memory unit (such as, for example, system memory 616) and a non-volatile storage device (such as, for example, primary storage device 632, as described in detail below). System memory 616 may be implemented as shared memory and/or distributed memory in a network device. Furthermore, system memory 616 may store packets and/or other information used in networking operations. In one example, system memory 616 may include and/or store one or more of modules 102 from FIG. 1.

In certain embodiments, exemplary computing system 600 may also include one or more components or elements in addition to processor 614 and system memory 616. For example, as illustrated in FIG. 6, computing system 600 may include a memory controller 618, an Input/Output (I/O) controller 620, and a communication interface 622, each of which may be interconnected via communication infrastructure 612. Communication infrastructure 612 generally represents any type or form of infrastructure capable of facilitating communication between one or more components of a computing device. Examples of communication infrastructure 612 include, without limitation, a communication bus (such as a Serial ATA (SATA), an Industry Standard Architecture (ISA), a Peripheral Component Interconnect (PCI), a PCI Express (PCIe), and/or any other suitable bus), and a network.

Memory controller 618 generally represents any type or form of device capable of handling memory or data or controlling communication between one or more components of computing system 600. For example, in certain embodiments memory controller 618 may control communication between processor 614, system memory 616, and I/O controller 620 via communication infrastructure 612. In some embodiments, memory controller 618 may include a Direct Memory Access (DMA) unit that may transfer data (e.g., packets) to or from a link adapter.

I/O controller 620 generally represents any type or form of device or module capable of coordinating and/or controlling the input and output functions of a computing device. For example, in certain embodiments I/O controller 620 may control or facilitate transfer of data between one or more elements of computing system 600, such as processor 614, system memory 616, communication interface 622, and storage interface 630.

Communication interface 622 broadly represents any type or form of communication device or adapter capable of facilitating communication between exemplary computing system 600 and one or more additional devices. For example, in certain embodiments communication interface 622 may facilitate communication between computing system 600 and a private or public network including additional computing systems. Examples of communication interface 622 include, without limitation, a link adapter, a wired network interface (such as a network interface card), a wireless network interface (such as a wireless network interface card), and any other suitable interface. In at least one embodiment, communication interface 622 may provide a direct connection to a remote server via a direct link to a network, such as the Internet. Communication interface 622 may also indirectly provide such a connection through, for example, a local area network (such as an Ethernet network), a personal area network, a wide area network, a private network (e.g., a virtual private network), a telephone or cable network, a cellular telephone connection, a satellite data connection, or any other suitable connection.

In certain embodiments, communication interface 622 may also represent a host adapter configured to facilitate communication between computing system 600 and one or more additional network or storage devices via an external bus or communications channel. Examples of host adapters include, without limitation, Small Computer System Interface (SCSI) host adapters, Universal Serial Bus (USB) host adapters, IEEE 1394 host adapters, Advanced Technology Attachment (ATA), Parallel ATA (PATA), Serial ATA (SATA), and External SATA (eSATA) host adapters, Fibre Channel interface adapters, Ethernet adapters, or the like. Communication interface 622 may also enable computing system 600 to engage in distributed or remote computing. For example, communication interface 622 may receive instructions from a remote device or send instructions to a remote device for execution.

As illustrated in FIG. 6, exemplary computing system 600 may also include a primary storage device 632 and/or a backup storage device 634 coupled to communication infrastructure 612 via a storage interface 630. Storage devices 632 and 634 generally represent any type or form of storage device or medium capable of storing data and/or other computer-readable instructions. For example, storage devices 632 and 634 may represent a magnetic disk drive (e.g., a so-called hard drive), a solid state drive, a floppy disk drive, a magnetic tape drive, an optical disk drive, a flash drive, or the like. Storage interface 630 generally represents any type or form of interface or device for transferring data between storage devices 632 and 634 and other components of computing system 600.

In certain embodiments, storage devices 632 and 634 may be configured to read from and/or write to a removable storage unit configured to store computer software, data, or other computer-readable information. Examples of suitable removable storage units include, without limitation, a floppy disk, a magnetic tape, an optical disk, a flash memory device, or the like. Storage devices 632 and 634 may also include other similar structures or devices for allowing computer software, data, or other computer-readable instructions to be loaded into computing system 600. For example, storage devices 632 and 634 may be configured to read and write software, data, or other computer-readable information. Storage devices 632 and 634 may be a part of computing system 600 or may be separate devices accessed through other interface systems.

Many other devices or subsystems may be connected to computing system 600. Conversely, all of the components and devices illustrated in FIG. 6 need not be present to practice the embodiments described and/or illustrated herein. The devices and subsystems referenced above may also be interconnected in different ways from those shown in FIG. 6. Computing system 600 may also employ any number of software, firmware, and/or hardware configurations. For example, one or more of the exemplary embodiments disclosed herein may be encoded as a computer program (also referred to as computer software, software applications, computer-readable instructions, or computer control logic) on a computer-readable medium. The term "computer-readable medium" generally refers to any form of device, carrier, or medium capable of storing or carrying computer-readable instructions. Examples of computer-readable media include, without limitation, transmission-type media, such as carrier waves, and non-transitory-type media, such as magnetic-storage media (e.g., hard disk drives and floppy disks), optical-storage media (e.g., Compact Disks (CDs) and Digital Video Disks (DVDs)), electronic-storage media (e.g., solid-state drives and flash media), and other distribution systems.

While the foregoing disclosure sets forth various embodiments using specific block diagrams, flowcharts, and examples, each block diagram component, flowchart step, operation, and/or component described and/or illustrated herein may be implemented, individually and/or collectively, using a wide range of hardware, software, or firmware (or any combination thereof) configurations. In addition, any disclosure of components contained within other components should be considered exemplary in nature since many other architectures can be implemented to achieve the same functionality.

In some examples, all or a portion of system 100 in FIG. 1 may represent portions of a cloud-computing or network-based environment. Cloud-computing and network-based environments may provide various services and applications via the Internet. These cloud-computing and network-based services (e.g., software as a service, platform as a service, infrastructure as a service, etc.) may be accessible through a web browser or other remote interface. Various functions described herein may also provide network switching capabilities, gateway access capabilities, network security functions, content caching and delivery services for a network, network control services, and/or and other networking functionality.

In addition, one or more of the modules described herein may transform data, physical devices, and/or representations of physical devices from one form to another. Additionally or alternatively, one or more of the modules recited herein may transform a processor, volatile memory, non-volatile memory, and/or any other portion of a physical computing device from one form to another by executing on the computing device, storing data on the computing device, and/or otherwise interacting with the computing device.

The process parameters and sequence of the steps described and/or illustrated herein are given by way of example only and can be varied as desired. For example, while the steps illustrated and/or described herein may be shown or discussed in a particular order, these steps do not necessarily need to be performed in the order illustrated or discussed. The various exemplary methods described and/or illustrated herein may also omit one or more of the steps described or illustrated herein or include additional steps in addition to those disclosed.

The preceding description has been provided to enable others skilled in the art to best utilize various aspects of the exemplary embodiments disclosed herein. This exemplary description is not intended to be exhaustive or to be limited to any precise form disclosed. Many modifications and variations are possible without departing from the spirit and scope of the instant disclosure. The embodiments disclosed herein should be considered in all respects illustrative and not restrictive. Reference should be made to the appended claims and their equivalents in determining the scope of the instant disclosure.

Unless otherwise noted, the terms "connected to" and "coupled to" (and their derivatives), as used in the specification and claims, are to be construed as permitting both direct and indirect (i.e., via other elements or components) connection. In addition, the terms "a" or "an," as used in the specification and claims, are to be construed as meaning "at least one of." Finally, for ease of use, the terms "including" and "having" (and their derivatives), as used in the specification and claims, are interchangeable with and have the same meaning as the word "comprising."

What is claimed is:

1. A method comprising:
   identifying a Routing Information Base (RIB) that includes a set of routes that define paths to destinations both inside and outside a network; and
   creating a Forwarding Information Base (FIB) that includes a subset of active routes that has a total size below a size threshold by:
   importing, from the set of routes within the RIB into the FIB:
      internal routes that define paths to destinations inside the network;
      high-traffic external routes that define paths to destinations outside the network that are receiving amounts of traffic that exceed a traffic threshold; and
      a default route that defines a path to a default node that facilitates resolution of traffic that does not match any of the internal or high-traffic external routes; and
   excluding, from the FIB, low-traffic external routes that define paths to destinations outside the network that do not receive amounts of traffic that exceed the traffic threshold.

2. The method of claim 1, wherein creating the FIB comprises:
   identifying a policy that defines which routes within the RIB to import into the FIB; and
   creating the FIB based at least in part on the policy.

3. The method of claim 2, wherein importing the high-traffic external routes from the RIB comprises:
   determining that a destination is currently receiving an amount of traffic that exceeds the traffic threshold; and bypassing the policy that defines which routes to import into the FIB by:
  setting, within the RIB, a policy-bypass flag of at least one of the routes that defines a path to the destination; and
  installing the route into the FIB due at least in part to the policy-bypass flag being set.

4. The method of claim 3, wherein bypassing the policy that defines which routes to import into the FIB comprises installing the route into the FIB even though the policy does not call for the route to be installed into the FIB.

5. The method of claim 1, wherein creating the FIB comprises importing, from the set of routes within the RIB, high-traffic external routes that define paths to destinations whose popularity ranks above a certain popularity threshold.

6. The method of claim 1, wherein importing the high-traffic external routes from the RIB comprises:
  identifying a specific destination that is currently receiving an amount of traffic that exceeds the traffic threshold;
  identifying, within the RIB, a route that defines a path to the specific destination that is currently receiving the amount of traffic that exceeds the traffic threshold; and
  installing the route that defines the path to the specific destination from the RIB into the FIB.

7. The method of claim 1, further comprising:
  determining that a specific destination to which at least one of the high-traffic external routes corresponds is no longer receiving an amount of traffic that exceeds the traffic threshold; and
  in response to determining that the destination is no longer receiving an amount of traffic that exceeds the traffic threshold, removing the high-traffic external route corresponding to the destination from the FIB.

8. The method of claim 1, wherein removing the high-traffic external route corresponding to the destination from the FIB comprises creating available space in the FIB to import at least one additional high-traffic external route from the RIB.

9. The method of claim 1, further comprising:
  receiving a packet to be forwarded to a destination based at least in part on the subset of active routes included in the FIB;
  identifying, within the FIB, an active route that matches the destination of the packet; and
  forwarding the packet to the destination via the path defined by the active route identified within the FIB.

10. The method of claim 9, wherein:
  the default node comprises a route-resolution assistant that includes a copy of the set of routes within the RIB; and
  forwarding the packet to the destination comprises forwarding, from a router within the network, the packet to the route-resolution assistant to enable the route-resolution assistant to:
    determine a route that defines a path to a next hop of the packet;
    apply, to the packet, a MultiProtocol Label Switching (MPLS) label that identifies the route that defines the path to the next hop; and
    at least one of:
      return the packet with the MPLS label to the router; and
      forward the packet with the MPLS label to another router within the network.

11. The method of claim 10, wherein returning the packet with the MPLS label to the router comprises:
  receiving, at the router, the packet with the MPLS label from the route-resolution assistant;
  determining, based at least in part on the MPLS label, the next hop of the packet;
  removing the MPLS label from the packet; and
  forwarding the packet to the next hop via the path to facilitate delivery of the packet to a final destination.

12. The method of claim 9, wherein:
  the default route comprises a plurality of default routes that define paths to a plurality of peer networks that facilitate resolution of traffic that does not match any of the internal or high-traffic external routes;
  identifying the active route that matches the destination of the packet comprises:
    identifying header information in connection with the packet;
    generating a hash from the header information identified in connection with the packet; and
    selecting one of the peer networks based at least in part on the hash generated from the header information; and
  forwarding the packet to the destination comprises forwarding the packet to the selected peer network to enable the selected peer network to determine a route that defines a path to a next hop of the packet.

13. The method of claim 9, wherein:
  the default node comprises a route-resolution proxy that:
    includes a copy of the set of routes within the RIB; and
    interfaces with a plurality of peer networks; and
  forwarding the packet to the destination comprises forwarding the packet to the route-resolution proxy to enable the route-resolution proxy to:
    identify one of the plurality of peer networks as a next hop of the packet; and
    forward the packet to the peer network identified as the next hop of the packet.

14. The method of claim 1, wherein the size threshold comprises an amount of memory allocated to the FIB.

15. A system comprising:
  an identification module, stored in memory, that identifies a Routing Information Base (RIB) that includes a set of routes that define paths to destinations both inside and outside a network;
  a creation module, stored in memory, that creates a Forwarding Information Base (FIB) that includes a subset of active routes that has a total size below a size threshold by:
    importing, from the set of routes within the RIB into the FIB:
      internal routes that define paths to destinations inside the network;
      high-traffic external routes that define paths to destinations outside the network that are receiving amounts of traffic that exceed a traffic threshold; and
      a default route that defines a path to a default node that facilitates resolution of traffic that does not match any of the internal or high-traffic external routes; and
    excluding, from the FIB, low-traffic external routes that define paths to destinations outside the network that do not receive amounts of traffic that exceed the traffic threshold; and
  at least one physical processor that executes the identification module and the creation module.

16. The system of claim 15, further comprising a receiving module, stored in memory, that receives a packet to be forwarded to a destination based at least in part on the subset of active routes included in the FIB;
   wherein the identification module further identifies, within the FIB, an active route that matches the destination of the packet;
   further comprising a forwarding module, stored in memory, that forwards the packet to the destination via the path defined by the active route identified within the FIB; and
   wherein the physical processor further executes the receiving module and the forwarding module.

17. The system of claim 15, wherein:
   the identification module identifies a policy that defines which routes within the RIB to import into the FIB; and
   the creation module creates the FIB based at least in part on the policy.

18. The system of claim 17, wherein the identification module determines that a destination is currently receiving an amount of traffic that exceeds the traffic threshold; and
   further comprising a bypass module, stored in memory, that bypasses the policy that defines which routes to import into the FIB by setting, within the RIB, a policy-bypass flag of at least one of the routes that defines a path to the destination; and
   wherein:
      the creation module installs the route into the FIB due at least in part to the policy-bypass flag being set; and
      the physical processor further executes the bypass module.

19. The system of claim 18, wherein the creation module installs the route into the FIB even though the policy does not call for the route to be installed into the FIB.

20. An apparatus comprising:
   a memory device that stores a Routing Information Base (RIB) that includes a set of routes that define paths to destinations both inside and outside a network; and
   a processing unit communicatively coupled to the memory device, wherein the processing unit creates a Forwarding Information Base (FIB) that includes a subset of active routes that has a total size below a size threshold by:
      importing, from the set of routes within the RIB into the FIB:
         internal routes that define paths to destinations inside the network;
         high-traffic external routes that define paths to destinations outside the network that are receiving amounts of traffic that exceed a traffic threshold; and
         a default route that defines a path to a default node that facilitates resolution of traffic that does not match any of the internal or high-traffic external routes; and
      excluding, from the FIB, low-traffic external routes that define paths to destinations outside the network that do not receive amounts of traffic that exceed the traffic threshold.

\* \* \* \* \*